United States Patent [19]
Howell et al.

[11] Patent Number: 5,501,476
[45] Date of Patent: Mar. 26, 1996

[54] MUSCLE POWERED THERAPEUTIC VEHICLE

[75] Inventors: Glade Howell, Salt Lake City; Jeff W. Bean, Kaysville; Judith L. Gooch, Salt Lake City; Donald Bloswick, Salt Lake City; Don R. Brown, Salt Lake City, all of Utah

[73] Assignee: University of Utah Research Foundation, Salt Lake City, Utah

[21] Appl. No.: 376,128

[22] Filed: Jan. 19, 1995

Related U.S. Application Data

[63] Continuation of Ser. No. 888,724, May 26, 1992, abandoned.

[51] Int. Cl.$^6$ ............................................. B62M 1/04
[52] U.S. Cl. ......................... 280/230; 280/256; 280/290; 297/215.12; 482/57
[58] Field of Search ...................... 280/288.4, 252, 280/253, 256, 290, 200, 223, 224, 230, 233, 259, 262; 297/DIG. 9, 466, 383; 482/51, 57, 62

[56] References Cited

U.S. PATENT DOCUMENTS

| | | | |
|---|---|---|---|
| 343,165 | 6/1886 | Fay | 280/256 |
| 377,869 | 2/1888 | Stillman | 280/256 |
| 636,222 | 10/1899 | Killen | 297/DIG. 9 |
| 1,383,070 | 6/1921 | Bukolt | 280/256 |
| 1,574,843 | 3/1926 | Nowak | 280/256 |
| 3,180,678 | 5/1962 | McCabe | 297/5 |
| 3,850,353 | 11/1974 | Foulds | 297/DIG. 9 |
| 4,351,406 | 9/1982 | Lay | 280/256 |
| 4,619,462 | 10/1986 | Shaffer et al. | 280/242.1 |
| 4,673,190 | 6/1987 | Ahlberg | 280/290 |
| 4,746,135 | 5/1988 | Oh | 280/262 |
| 4,761,013 | 8/1988 | Dowton | 280/218 |
| 4,779,882 | 10/1988 | Date | 280/230 |
| 4,867,441 | 9/1989 | Blakeman | 482/57 |
| 4,909,526 | 3/1990 | Vazin | 280/230 |
| 5,005,825 | 4/1991 | Fogel | 280/294 |

FOREIGN PATENT DOCUMENTS

| | | | |
|---|---|---|---|
| 0398350 | 12/1988 | Belgium | 280/230 |
| 0896837 | 3/1945 | France | 280/230 |
| 0081199 | 11/1894 | Germany | 280/230 |

Primary Examiner—Anne Marie Boehler
Attorney, Agent, or Firm—Thorpe, North & Western

[57] ABSTRACT

A therapeutic wheeled vehicle particularly suited for strengthening the hip extensor muscles of a user is described. The vehicle combines the therapeutic benefits of conditioning the hip extensor muscles with the enjoyable activity of propelling oneself on a wheeled vehicle. A frame is provided following the general pattern of a tricycle with one steerable wheel and a pair of driving wheels. A seat, a back rest, and at least one strap for holding the user in position on the seat and the back rest are also provided. These user support structures securely hold the user in the proper operating position, even when the user has less than normal muscular control and strength, such as with children with cerebral palsy. Structures are included for receiving at least a portion of the user's leg between the user's knee and the user's hip and for transmitting the extension motion of the user's hips into the rotational movement of the pair of driving wheels. Substantially only the hip extensor group of muscles of the user are used to propel the vehicle.

18 Claims, 2 Drawing Sheets

MUSCLE POWERED THERAPEUTIC VEHICLE

This invention was made with federal support under grant number 5T150H7141-14 awarded by the National Institute for Occupational Safety and Health (NIOSH). The government has certain rights in this invention.

This application is a continuation of application Ser. No. 07/888,724, filed May 26, 1992, now abandoned.

BACKGROUND

1. The Field of the Invention

This invention relates to human powered vehicles. More particularly, the present invention relates to therapeutic devices which are used to provide conditioning of specific muscles of the human body.

2. The Prior Art

The benefits of muscle powered activities are universally recognized. For example, the physiological benefits of pedaling a muscle powered wheeled vehicle, such as a bicycle or a tricycle, are well known. Unfortunately, some who need the benefits of such exercise the most are unable to use previously available bicycles and even tricycles.

In particular, children afflicted with cerebral palsy are generally unable to operate any of the previously available tricycles which are enjoyed by other children. Moreover, both adults and children may be afflicted with other disorders which make operating previously available bicycles and tricycles difficult or impossible. Thus, such persons are denied the benefits which accrue from such activities.

In particular, it is often the case that a person lacks either the muscle strength or coordination in the hip extensor muscles. Hip extensor muscles are critical for walking since they prevent trunk flexion and collapse. The hip extensor muscles are one of the major support muscles of the body used in standing and walking. Weakness of the hip extensor muscles cannot be treated with external bracing as is often the case with more distal muscles.

Moreover, in children with cerebral palsy who have undergone the selective dorsal rhizotomy procedure to reduce spasticity, hip extensor muscle weakness is frequently very pronounced. It is often the case that physical therapists work extensively (often for years) to strengthen these muscles in children with cerebral palsy. As a general rule, it is very difficult to strengthen muscles in children; they refuse to lift weights. However, children will ride tricycles. Disadvantageously, a conventional tricycle does not strengthen the hip extensor muscles; it primarily strengthens the quadriceps muscles.

Even though the is has been known for a long time that many persons, including children with cerebral palsy, are unable operate previously available tricycles, the problem of providing a muscle powered vehicle which can be operated by persons with particular disorders, and which will benefit such persons, has been unrecognized. Thus, in view of the inability of many individuals, for example children with cerebral palsy, to operate previously available bicycles and tricycles, it would be an advance in the art to provide a muscle powered wheeled vehicle which can be used by such individuals and which provides therapeutic conditioning to the hip extensor muscles.

BRIEF SUMMARY AND OBJECTS OF THE INVENTION

In view of the above described state of the art, the present invention seeks to realize the following objects and advantages.

It is a primary object of the present invention to provide a wheeled apparatus which can be powered by a person with impaired muscle control.

It is yet another object of the present invention to provide a muscle powered wheeled vehicle which can be operated by a child afflicted with cerebral palsy.

It is another object of the present invention to provide a muscle powered wheeled vehicle which will promote improvement in the walking gait of children with cerebral palsy.

It is a further object of the present invention to provide a muscle powered wheeled vehicle which promotes activation of the hip extensor muscles in a similar or greater amount than walking.

The present invention provides a therapeutic wheeled vehicle particularly suited for strengthening the hip extensor muscles of a user. The present invention combines the therapeutic benefits of conditioning the hip extensor muscles with the enjoyable activity of propelling oneself on a wheeled vehicle. Children, particularly those with disorders such as cerebral palsy, benefit from the present invention.

Embodiments of the present invention include a frame which is preferably constructed using materials and techniques similar to those used in bicycle and tricycle construction. The preferred embodiment of the present invention follows the general pattern of a tricycle having one steerable wheel and a handlebar connected to the frame and a pair of driving wheels connected to the rear of the frame.

A seat, a back rest, and at least one strap for holding the user in position on the seat and the back rest are also provided. These user support structures securely hold the user in the proper upright operating position, even when the user has less than normal muscular control and strength.

Importantly, the present invention includes means for receiving at least a portion of the user's leg between the user's knee and the user's hip preferably including means for receiving the back of the user's thigh. The present invention also includes means for transmitting the reciprocating movement of the user's hip into the rotational movement of the driving wheel or wheels such that the vehicle can be propelled by the hip movement of the user. The desired hip movement of the user is extension of the hip joint. In the preferred embodiment of the present invention, each of the user's legs are coupled to the driving wheels such that as the hip joints are alternately moved to extend the legs of the user the vehicle is propelled. Substantially only the hip extensor group of muscles are used to propel the vehicle thus providing conditioning for that specific group of muscles.

BRIEF DESCRIPTION OF THE DRAWINGS

In order to better appreciate how the above-recited and other advantages and objects of the invention are obtained, a more particular description of the invention briefly described above will be rendered by reference to a specific embodiment thereof which is illustrated in the appended drawings. Understanding that these drawings depict only a typical embodiment of the invention and are not therefore to be considered limiting of its scope, the invention will be described and explained with additional specificity and detail through the use of the accompanying drawings in which.

DETAILED DESCRIPTION OF THE PREFERRED EMBODIMENTS

Reference will now be made to the drawings wherein like structures will be provided with like reference designations.

Figure 1:
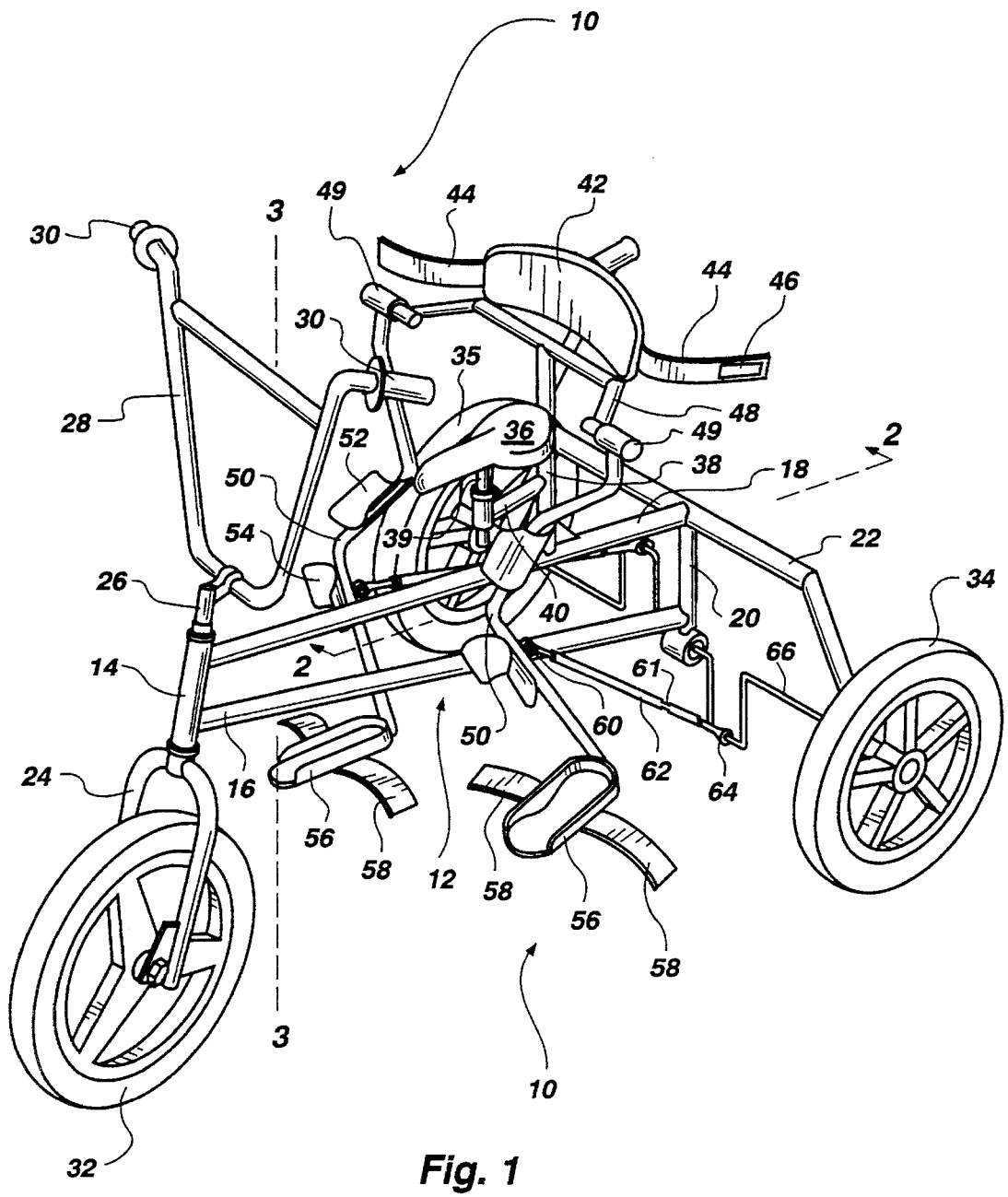
FIG. 1 is a perspective view of the presently preferred embodiment of the therapeutic vehicle of the present invention.

FIG. 1 provides a perspective view of the presently preferred example the therapeutic vehicle of the present invention. The described embodiment is particularly suited for use by children with cerebral palsy. Those skilled in the art will appreciate that the present invention has application with persons other than children and with disorders other than cerebral palsy. Still, the illustrated therapeutic vehicle will be described herein as being used with children having cerebral palsy with the understanding that the teachings provided herein can readily be used to provide therapeutic vehicles to benefit others.

As mentioned, children with cerebral palsy generally have deficient strength and control in the group of muscles used to extend the hip joint. The group of muscles involved in the extension motion of the hip principally includes the gluteus maximus muscle as well as, to a lesser extent, the biceps femoris, the semitendionosus, and the semimembranosus muscles which will collectively be referred to herein as the "hip extensor muscles."

Since the hip extensor muscles are critical to having a proper walking gait, these muscles must be developed in order for a child to walk properly. Unfortunately, children are notoriously uncooperative when required to engage in therapeutic exercise per se. With the therapeutic vehicle of the present invention, the hip extensor muscles are generally activated to a greater extent than with other modes of therapy suitable for children and the children find operating the vehicle to be an enjoyable activity. Thus, the child obtains the benefit of the therapeutic hip extensor muscle action while enjoying a common childhood activity which could not otherwise be enjoyed.

The therapeutic vehicle, generally represented at 10 in the figures, includes a frame, generally indicated at 12, and three wheels 32, 34, and 35, a handlebar 28, a seat 36, and drive components which will be described in detail later. Importantly, the vehicle 10 is configured as a three wheel tricycle to ensure a proper amount of stability and safety for the user. It is, however, within the scope of the present invention to use only two wheels, or more than three wheels, in embodiments of the present invention.

The frame 12 is preferably constructed using techniques used to construct bicycle frames. The frame 12 of the illustrated vehicle 10 includes a top tube 18, a rear driving wheel tube 22, a hanger tube 20, a down tube 16 and a head tube 14. The particular frame geometry illustrated in the figures is preferred but many other frame geometries and types of frame-like structures can be used within the scope of the present invention.

The front wheel 32 is attached to a fork 24 which is rotatably mounted in the head tube 14 preferably using bearing structures (not represented in the figures) available in the art. A stem 26 connects the handle bar 28 to the fork 24. The handle bar 28 is provided with grips 30 as is known in the art. The front wheel and the components associated with it are used to steer the therapeutic vehicle 10. As will be appreciated by those skilled in the art, these structures can be fabricated using components and techniques known in the art or one skilled in the appropriate art can take advantage of other components and techniques which would be suitable for fabrication of an embodiment of the present invention.

The illustrated therapeutic vehicle 10 includes two rear driving wheels 34 and 35, which, as in the case of the front wheel 32, preferably are of the type generally used in the bicycle and tricycle art. The rear driving wheels 34 and 35 are connected to an axle 66 which is connected to the frame 12 by way of bearing member 67, as shown best in FIG. 3. As will now be explained, the axle 66 is coupled to the legs of the user (not represented in the figures) so that the action of the hip extensor muscles alone will propel the therapeutic vehicle 10 thereby providing conditioning to said group of muscles.

As mentioned, the illustrated therapeutic vehicle 10 is particularly intended for use by children having cerebral palsy who, in order to obtain maximum benefit from the present invention, require support structures to keep their body in position as they use their hip extensor muscles to propel the therapeutic vehicle 10. In order to provide such support, a seat 36 and a back rest 42 are provided in the illustrated therapeutic vehicle 10. In order to transmit the action of the hip extensor muscles to the rear driving wheels 34 and 35, a crank 50 is provided for each leg of the user. Each of the cranks 50 hang from pivots 49 as will be explained more fully shortly.

Figure 2:
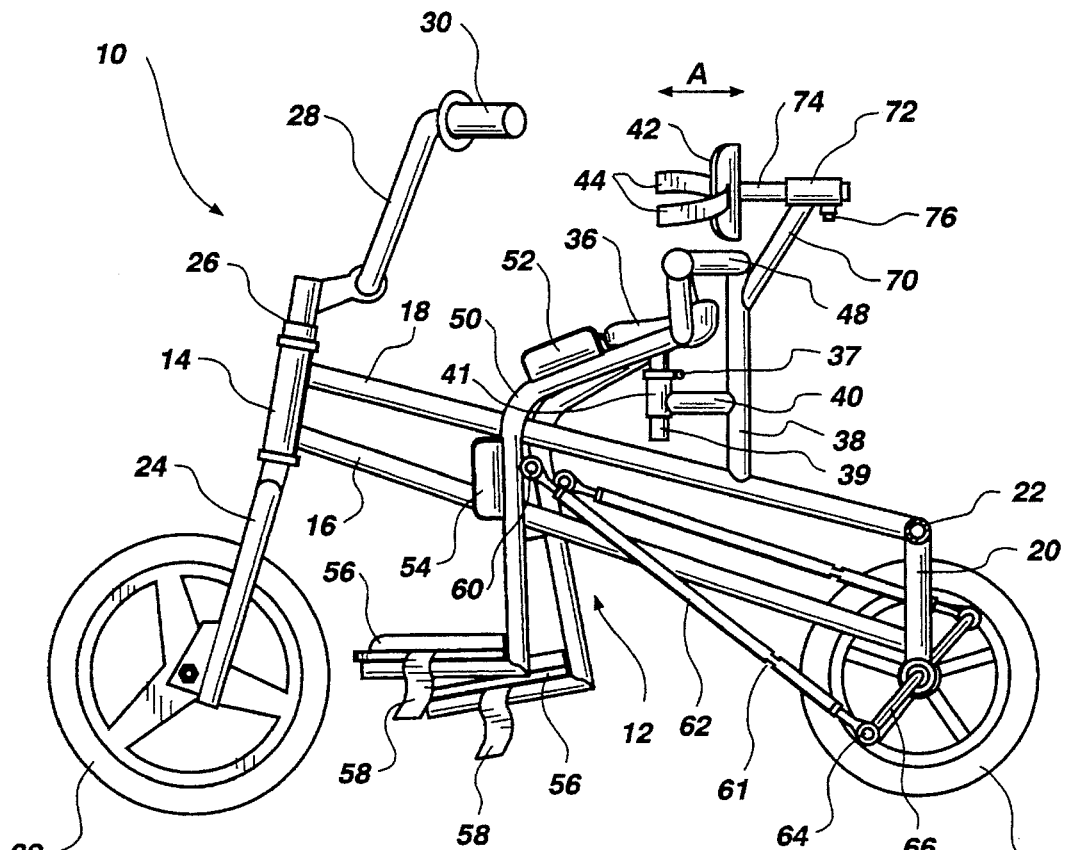
FIG. 2 is a cross sectional view of the therapeutic vehicle taken along line 2—2 of FIG. 1.

As shown best in FIG. 2, a seat 36 is provided to give vertical support to the user. The seat 36 is connected to a seat post 39 which can be locked into a vertical position using a locking bolt 37. A seat arm 40 is connected to a support tube 38 which is connected to the top tube 18 of the frame. The seat post 39 slides vertically within a sleeve 41 until the locking bolt 37 is tightened.

Figure 3:
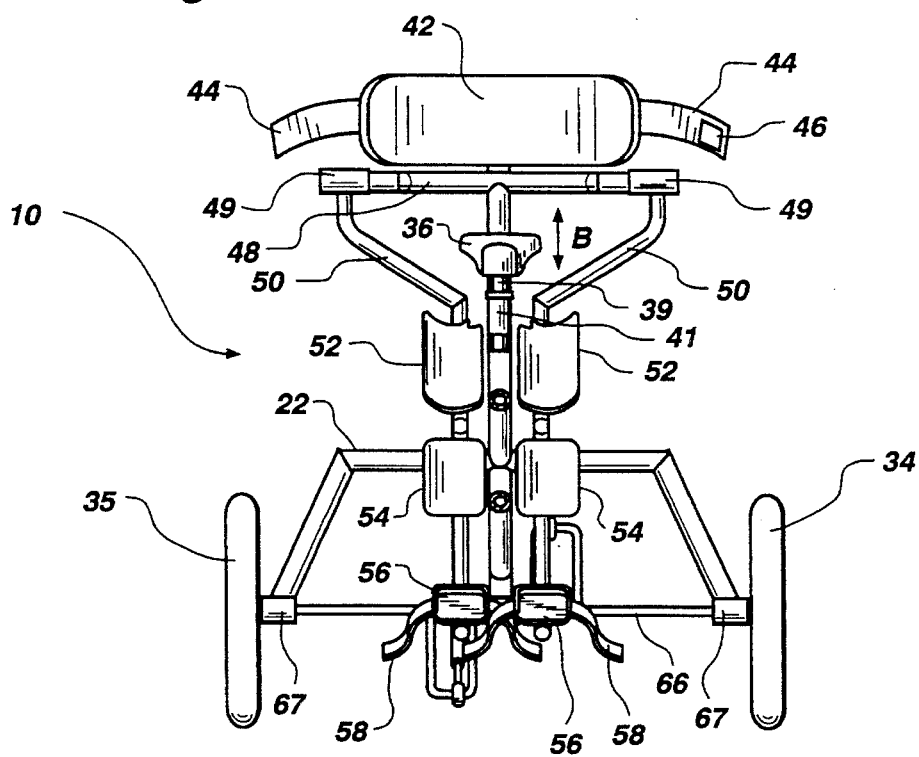
FIG. 3 is a cross sectional view of the therapeutic vehicle taken along line 3—3 of FIG. 1.

Referring now to FIG. 3, for best results, the height of the seat 36 should be adjusted in the direction of arrow B so that the hip joints of the user are at the same height as the crank pivots 49. Thus, lining up the crank pivots 49 approximately with the acetabulum, slightly above the greater trochanter of the hip, will generally be satisfactory. Other positions, however, may also be used as determined by experience with users of the therapeutic vehicle 10.

Referring now to the side view of FIG. 2, the back rest 42 is also provided to keep the user in the proper upright position. Also included is a strap 44 which wraps around the torso of the user and keeps the back of the user against the back rest 42. As can be seen best in FIG. 1, the back rest preferably has a curved shape to cradle the user's torso. The strap 44 is preferably provided with lengths of hook and pile fastener (one patch of which is represented at 46) to hold the strap together around the user. A buckle or some other type of fastener can be used on the strap 44 in place of the preferred hook and pile fastener 46.

As illustrated best in FIG. 2, the back rest 42 can be moved forward and backward in the direction of arrow A. The back rest 42 is attached to a back rest post 74 which passes through a sleeve 72. A locking bolt 76 positioned on the sleeve 72 holds the back rest 42 in position when tightened. A strut 70 connects the sleeve 72 to the support tube 38. While use of the user support structures described herein is preferred, other arrangements may also be used within the scope of the present invention. Furthermore, it is within the scope of the present invention to orient the user in positions other than the described upright position.

While being securely held in the proper position, the user can propel the therapeutic vehicle by using substantially just the hip extensor muscles. The drive train components, which will now be described in detail, function to couple the movement of the hip extensor muscles to the driving wheels 34 and 35. As will be appreciated, the drive train components used in embodiments of the present invention should provide support for the legs of the user so that primarily the hip extensor muscles are used and lack of strength or coordination in other muscles does not hinder the use of the present invention.

As illustrated best in FIG. 1, the cranks 50 are shaped so that as the user's leg is rested thereupon the knee of the user is comfortably bent. A thigh support 52 is included on the crank 50 and receives the back of the user's thigh. A calf support 54 is also provided on the crank 50 to hold the user's calf in place. A foot rest 56 receives the user's foot and a strap 58, which can be provided with some type of fastener such as a hook and pile fastener, holds the user's foot in place. Similarly, if desired, the thigh support 52 and the calf support 54 can also be provided with straps to hold the user's legs in place.

A first connecting rod extension 60 is pivotally connected to each of the cranks 50. Each of the connecting rod extensions 60 are attached to a connecting rod 62 which is in turn joined to a second connecting rod extension 64 which is rotationally connected to the eccentric portion of the axle 66.

Preferably, the effective length of the connecting rod 62 can be altered to increase or decrease the mechanical leverage provided between the cranks 50 and the axle 66. It is also within the scope of the present invention to provide a friction brake on one or more of the wheels 32, 34 and 35, or on the axle 66 or other structure in order to provide additional mechanical resistance to the propulsion of the therapeutic vehicle or to limit the speed thereof.

In the described therapeutic vehicle 10, the connecting rod 62 is provided with internal threads (not shown) which are engaged by external threads (not shown) provided on the first connecting rod extension 60 and the second connecting rod extension 64 and which allow the combined length of these structures to be increased or decreased by rotating the rod 62. A flat 61 is provided on the rod 62 to allow the rod to be gripped by a wrench and turned. Other structures can also be used, such as a turn buckle (not represented), to alter the length of the structures connecting the cranks 50 to the axle 66. It will be appreciated that it is also within the scope of the present invention to provide structures which allow changing the position at which a structure corresponding to the first connecting rod extension 60 is joined to the crank 50 or the changing eccentricity of the eccentric portion of the axle 66. Moreover, while the illustrated structure is preferred, it is within the scope of the present invention to use completely different arrangements to couple the movement of the user's hip extensor muscles to the driving wheels. As will now be appreciated, using the structure represented in the figures, as the user alternately activates his left side and right side hip extensor muscles, the cranks 50 will alternately pivot resulting in the rotation of the rear driving wheels 34 and 35.

In view of the foregoing, it will be appreciated that the present invention provides a muscle powered wheeled vehicle which can be readily operated by a child afflicted with cerebral palsy and which conditions the hip extensor muscles as it is used. The strengthening of the hip extensor muscles provided by the present invention promotes improvement in the walking gait of children with cerebral palsy and others as well. The present invention also provides a therapeutic vehicle which promotes activation of the hip extensor muscles in a similar or greater amount than walking and which is often more productive than other types of therapy.

The present invention may be embodied in other specific forms without departing from its spirit or essential characteristics. The described embodiment is to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A wheeled vehicle capable of being propelled by a user which is carried thereon, including users with less than normal muscular control and strength, the vehicle comprising:

a frame;

at least one steerable wheel connected to the frame;

user support means for supporting the user on the frame;

steering means for allowing the user to steer the steerable wheel;

means for receiving at least a portion of the user's thigh at a position on the user's leg between the user's knee and the user's hip, the means for receiving at least a portion of the user's thigh comprising means for receiving the back of the user's thigh such that contact with the back of the user's thigh is made and the means for receiving the back of the user's thigh is moved by the hip extension motion of the user;

means for pivotally connecting the means for receiving at least a portion of the user's thigh to the frame at a point in substantial alignment with the user's hip;

driving wheel means connected to the frame, the driving wheel means comprising a wheel and means for transmitting any extension motion of the user's hip into the rotational movement of the driving wheel means, the driving wheel means comprising an axle connected to a driving wheel, the axle having an eccentric portion thereof and the means for receiving at least a portion of the user's thigh comprising means for connecting the back of the user's thigh to the eccentric portion of the axle; and means for transmitting the extension motion of the user's hip into the rotational movement of the driving wheel means such that the vehicle can be propelled by the hip extension motion of the user.

2. A wheeled vehicle as defined in claim 1 wherein the frame comprises:

a top tube;

a down tube; and a head tube.

3. A wheeled vehicle as defined in claim 1 wherein the user support means further comprises:

a seat;

means for selecting a vertical height for the seat;

a back rest;

means for selecting a horizontal position for the back rest; and a strap positioned on the back rest.

4. A wheeled vehicle as defined in claim 1 wherein the driving wheel means comprises:
   a first rear driving wheel; and
   a second rear driving wheel.

5. A wheeled vehicle as defined in claim 1 wherein the means for receiving at least a portion of the user's thigh further comprises means for pivoting the means for receiving the back of the user's thigh about a point in substantial alignment with a hip of the user.

6. A wheeled vehicle as defined in claim 5 wherein the means for receiving at least a portion of the user's leg further comprises:
   means for receiving the back of the user's calf; and means for receiving the user's foot.

7. A wheeled vehicle as defined in claim 1 wherein the driving wheel means comprises two rear driving wheels.

8. A wheeled vehicle as defined in claim 1 further comprising means for changing the mechanical leverage provided between the axle connected to the driving wheel and the means for connecting the back of the users thigh to the eccentric portion of the axle.

9. A wheeled vehicle as defined in claim 8 wherein the means for changing the mechanical leverage provided between the axle connected to the driving wheel and the means for connecting the back of the user's thigh to the eccentric portion of the axle comprises means for altering the effective length of the means for connecting the back of the user's thigh to the eccentric portion of the axle.

10. A therapeutic wheeled vehicle for strengthening the hip extensor muscles of a user as it is being propelled by the muscle power of the user which is carried thereon, the therapeutic vehicle comprising:
    a frame;
    a steerable wheel connected to the frame;
    a seat adapted for supporting the user above a portion of the frame;
    a rest adapted for horizontally supporting the user on the seat including users with less than normal muscular control and strength;
    a strap for holding the user in position on the seat and the rest;
    handle bars connected to the steerable wheel for allowing the user to steer the steerable wheel;
    a pair of driving wheels, each of the driving wheels rotatably joined to the frame;
    an axle connecting the pair of driving wheels;
    first means for receiving at least a portion of the user's left thigh between the user's left knee and the user's left hip, the first means for receiving comprising means for receiving the back of the user's left thigh such that contact with the back of the user's left thigh is made and the means for receiving the back of the user's left thigh is moved by the left hip extension motion of the user and such that the means for receiving the user's left hip pivots about a point in substantial alignment with the left hip of the user;
    second means for receiving at least a portion of the user's right thigh between the user's right knee and the user's right hip, the second means for receiving comprising means for receiving the back of the user's right thigh such that contact with the back of the user's right thigh is made and the means for receiving the back of the user's right thigh is moved by the right hip extension motion of the user and such that the means for receiving the user's right hip pivots about a point in substantial alignment with the right hip of the user;
    means for transmitting the alternating extension motion of the user's first and second hip muscles to the axle such that rotational movement of the pair of driving wheels is produced and such that the vehicle is propelled by the movement of the user's hip extensor muscles.

11. A wheeled therapeutic vehicle as defined in claim 10 wherein the frame comprises:
    a top tube;
    a down tube; and
    a head tube.

12. A wheeled therapeutic vehicle as defined in claim 10 further comprising:
    means for receiving the back of the user's left calf;
    means for receiving the user's left foot, the means for receiving the back of the user's left calf and the means for receiving the user's left foot being connected to the means for transmitting;
    means for receiving the back of the user's right calf; and
    means for receiving the user's right foot, the means for means for receiving the back of the user's right calf and the means for receiving the user's right foot being connected to the means for transmitting.

13. A wheeled therapeutic vehicle as defined in claim 10 further comprising means for changing the mechanical leverage provided between the first means for receiving and the second means for receiving and the means for transmitting.

14. A wheeled therapeutic vehicle as defined in claim 10 wherein the means for transmitting comprises a rod interconnecting the first means for receiving and the axle, the axle having an eccentric portion thereof, and wherein the means for changing the mechanical leverage comprises means for altering the effective length of the rod which interconnects the first means for receiving to the eccentric portion of the axle.

15. A wheeled vehicle capable of being propelled by a user which is carried thereon, the vehicle comprising:
    a frame;
    at least one steerable wheel connected to the frame;
    user support means for supporting the user on the frame;
    steering means for allowing the user to steer the steerable wheel;
    driving wheel means connected to the frame and comprising a wheel;
    means for receiving at least a portion of the user's thigh at a position on the user's leg between the user's knee and the user's hip, the means for receiving at least a portion of the user's thigh comprising:
    means for receiving the back of the user's thigh such that contact with the back of the user's thigh is made;
    means for pivoting the means for receiving the back of the user's thigh about a point in substantial alignment with a hip of the user;
    means for receiving the back of the user's calf; and
    means for receiving the user's foot;
    and the means for receiving the back of the user's thigh is moved by the hip extension motion of the user; and
    means for transmitting the extension motion of the user's hip into the rotational movement of the driving wheel means such that the vehicle can be propelled by the hip extension motion of the user, said means for transmitting comprising an axle connected to the driving wheel, the axle having an eccentric portion thereof and means for connecting the back of the user's thigh to the eccentric portion of the axle.

16. A wheeled vehicle as defined in claim 15 wherein the driving wheel means further comprises two rear driving wheels.

17. A wheeled vehicle as defined in claim 15 further comprising means for changing the mechanical leverage provided between the axle connected to the driving wheel and the means for connecting the back of the user's thigh to the eccentric portion of the axle.

18. A wheeled vehicle as defined in claim 17 wherein the means for changing the mechanical leverage provided between the axle connected to the driving wheel and the means for connecting the back of the user's thigh to the eccentric portion of the axle comprises means for altering the effective length of the means for connecting the back of the user's thigh to the eccentric portion of the axle.

* * * * *